(12) United States Patent
Pooley et al.

(10) Patent No.: US 8,468,577 B1
(45) Date of Patent: Jun. 18, 2013

(54) MANAGED WEBSITE SYSTEM AND METHOD

(75) Inventors: Charles E. Pooley, Clawson, MI (US);
David H. Hill, San Diego, CA (US);
Antoine G. Dubeauclard, Royal Oak, MI (US); Michael B. Frederick, Birmingham, MI (US); John A. Himmelspach, Rochester Hills, MI (US)

(73) Assignee: Workfolio, LLC, Troy, MI (US)

( * ) Notice: Subject to any disclaimer, the term of this patent is extended or adjusted under 35 U.S.C. 154(b) by 117 days.

(21) Appl. No.: 13/103,034

(22) Filed: May 6, 2011

Related U.S. Application Data (60) Provisional application No. 61/332,011, filed on May 6, 2010.

(51) Int. Cl.
*H04L 9/00* (2006.01)

(52) U.S. Cl.
USPC .................................. 726/1; 726/27; 726/28

(58) Field of Classification Search
USPC ........... 726/1–8, 10–11, 26–28; 713/193–194
See application file for complete search history.

(56) References Cited

U.S. PATENT DOCUMENTS

| | | | |
|---|---|---|---|
| 6,557,009 B1 * | 4/2003 | Singer et al. | 715/740 |
| 7,124,189 B2 * | 10/2006 | Summers et al. | 709/227 |
| 7,613,708 B2 | 11/2009 | Rieffanaugh, Jr. | |
| 7,676,505 B2 | 3/2010 | Chess et al. | |
| 7,747,941 B2 | 6/2010 | Campbell et al. | |
| 7,818,194 B2 | 10/2010 | Yoshida et al. | |
| 7,861,309 B2 | 12/2010 | Spearman et al. | |
| 7,870,253 B2 | 1/2011 | Muilenburg et al. | |
| 2006/0294199 A1 | 12/2006 | Bertholf | |
| 2007/0011650 A1 | 1/2007 | Hage et al. | |
| 2008/0065405 A1 | 3/2008 | Adelman et al. | |
| 2008/0313260 A1 | 12/2008 | Sweet et al. | |
| 2009/0094137 A1 | 4/2009 | Topenberg et al. | |
| 2009/0254392 A1 | 10/2009 | Zander | |
| 2009/0300709 A1 | 12/2009 | Chen et al. | |
| 2010/0162365 A1 | 6/2010 | Del Real | |
| 2010/0293448 A1 | 11/2010 | Rand et al. | |

* cited by examiner

*Primary Examiner* — Hosuk Song
(74) *Attorney, Agent, or Firm* — Brooks Kushman P.C.

(57) ABSTRACT

A system and method for developing websites for members of an organization include configuring and storing organization content using a server computer associated with the organization, configuring and storing member content associated with the members of the organization using the server computer, screening member content based by applying an organization policy stored on the server computer to prohibit specified information from being included in member content, and delivering a web page having the enterprise content arranged with member content in response to a request by a user for viewing a webpage having a URL corresponding to one of the members of the organization. The systems and methods may also include storing a visibility level for specified member content that limits access to the specified member content only to authorized users within the organization, in a specified group, by password, or private to the member, for example.

26 Claims, 10 Drawing Sheets

MANAGED WEBSITE SYSTEM AND METHOD

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS-REFERENCE TO RELATED APPLICATION

This application claims priority under 35 U.S.C. §119(e) to U.S. provisional patent application Ser. No. 61/332,011 filed May 6, 2010, the disclosure of which is incorporated by reference in its entirety.

TECHNICAL FIELD

The present invention relates to a system that provides a managed website and a method of providing an enterprise managed employee website that is accessible by external networks such as the internet and that also may function as part of an intranet.

BACKGROUND

Internet-based systems are available that encourage individuals to network with others. Commonly used social networking systems include Facebook, MySpace, Linked-In, and the like. One problem with all of such systems is that they are controlled by the individual that sets up the account with the social networking service provider. Despite the opportunities afforded by such systems for developing business relationships, many businesses discourage or prohibit accessing social networking sites from company computers. The lack of control over these social networking sites is a serious detriment to their use in business. For example, social networking sites may provide a channel for the disclosure of confidential information. Employment services have been known to use such networking sites to hire away employees. Employees may post damaging content on a networking site that may present a risk to company or brand reputation. Employees do not generally use their social networking site as a reference on business cards or in e-mails due to the lack of professionalism denoted by using such networking sites in connection with business endeavors.

Businesses generally derive no benefit from the use of social networking or business networking sites as they currently exist. There is no practical way to include advertising or a public relations piece on an employee's networking site. There is also no way to use networking sites to track employee communications or to control content of communications sent by employees. Current networking sites do not facilitate development of work groups or teams and do not provide an efficient way to share content directly with other members of a team. Social networking sites also do not allow an employer to access employee networking sites to determine the special skills, expertise, and knowledge of its employees. Networking sites also fail to provide any mechanism for a business or other entity to prohibit objectionable content from being posted on employee websites. In addition, networking sites do not provide an efficient way for a business or other entity to obtain feedback relative to the number of sites visited, the extent of use of the site, or surveying customers as to their experience on visiting a site.

Company websites are generally impersonal in tone and context in that they fail to convey information that emphasizes the talents and contributions made by individuals who are employed by the company. Websites maintained by companies also fail to reflect the specific interests of individuals within the enterprise that may be important to persons searching the company website. For example, if a company is interested in working with another company that has highly skilled engineers who also speak a particular language, there would be no way to learn this information by simply visiting a company's website.

Company websites are expensive to create and maintain. Most companies retain an outside consultant or contractor to develop a website. Websites become out-of-date soon after they are established especially if the websites include specific information relating to employees and specific projects and accomplishments of the organization. Development of websites generally requires extensive programming skills to code the website content. In addition, most currently available websites do not facilitate creation of secure or hidden pages or provide an easy-to-use mechanism for limiting distribution of information contained on selected pages or portions of the website.

Many businesses have intranets that are intended to facilitate communication within an organization that are not normally accessible from outside of an organization. An employee may be able to add content or provide profiles for some intranet systems. However, it is difficult to motivate employees to populate their personnel profiles on the internet. This handicaps the company from providing a knowledge map of an organization that may be used by human resources professionals or management to select employees for a particular assignment or job based upon their experience and accomplishments.

Current intranets do not provide a mechanism for a business or other entity to reward employees who are effective in generating traffic to an enterprise website.

These and other problems and shortcomings associated with prior art social networking systems, websites, and intranets are addressed by the system and method described in the following detailed description.

SUMMARY

A system and method for developing websites for members of an organization include configuring and storing organization content using a server computer associated with the organization, configuring and storing member content associated with the members of the organization using the server computer, screening member content based by applying an organization policy stored on the server computer to prohibit specified information from being included in member content, and delivering a web page having the enterprise content arranged with member content in response to a request by a user for viewing a webpage having a URL corresponding to one of the members of the organization. The systems and methods may also include storing a visibility level for specified member content that limits access to the specified member content only to authorized users within the organization, in a specified group, by password, or private to the member and system administrator, for example. Embodiments may also include predefined applications, modules, or widgets that may be selected and positioned by particular members to provide modular customization of the member or associate portion of the member's webpage.

In various embodiments, a website sponsored by an enterprise is disclosed that affords a measure of control over employees' or agents' use of the website to provide a professional content web page. Most, if not all, of the web pages include a designated portion that provides content relating to and/or controlled by the enterprise.

Another aspect of the disclosure is that the enterprise may exercise control over the content of employee or member web pages posted on the website by applying a policy or filter including rules that prohibit the inclusion of specified information, which may include proprietary information or profanity, for example. The enterprise may establish one or more policies that include rules automatically applied by the web server computer or other web page development computer that prevent the inclusion of profanity, pornography or offensive language on an employee website or webpage. Alternatively, or in combination, member content may be automatically held pending review and approval by an administrator or supervisor before being accessible for viewing by other users.

The modular customization concept embodied in the disclosure facilitates development of a professional website employing any combination of available pre-existing widgets or applications that may function as templates for the website content provided by employees or agents of an enterprise. No coding or formatting is required when selecting, configuring, and placing existing widgets to produce a personalized, yet professional, web page that is fully featured with interesting content. Systems and methods according to the present disclosure provide a convenient way to assemble a personal website that may be developed from proprietary or public domain sources and/or from internally developed custom widgets.

The system and method disclosed provide a hierarchical management model on which a group administrator manages the website(s) of an organization. For larger organizations, department administrators may be responsible for management of a sub-set of the websites or web pages. If necessary, additional layers of administrators may be added and the management structure can be organized in the manner of an organization chart, for example.

The system and method may also permit monitoring of employee web page content and track visits to all of the enterprise's employees' web pages or websites. Hits may be tracked to determine which employee's web page is effective in generating web traffic to the enterprise with each employee acting as an affiliate of the enterprise. The system and method may also monitor the extent of web page usage and gather user feedback by providing surveys or questionnaires.

Another feature of various embodiments of the present disclosure is that a composite of the employee web pages may function as part of an intranet based on a visibility parameter that limits access or display of specified web pages to authorized users within the organization. Employee web pages may be selectively shared among employees to foster team work by allowing page content to be shared or jointly developed among work groups or departments, for example. The web pages have content about individual users that can be used for the purpose of knowledge mapping by others, with access being controlled or specified by the company and/or group administrator. As used herein the term "knowledge mapping" refers to assessing the strengths and weaknesses of a business or other entity in knowledge terms and matching people and jobs accordingly.

Systems and methods according to the present disclosure foster development of a personalized company website that is continually updated with information about employees. The talents and contributions of individuals within the enterprise may be more easily featured and promoted. Visitors to the website can learn about the backgrounds, special skills, and achievements of employees.

Another aspect of the disclosure is that web pages or portions thereof may be inaccessible or hidden from others, whether inside or outside of the enterprise or organization based on a corresponding visibility level associated with specified employee or member content. For example, financial reports may be developed and shared jointly by authorized personnel in the accounting department, but hidden from other employees using a corresponding visibility parameter, flag, etc. When the financial reports are completed on a web page, they may be first made available to management for approval and then released publicly. This approach facilitates teamwork while maintaining control over sensitive information.

One of ordinary skill in the art to which this disclosure is directed will readily appreciate many other applications and advantages that may be obtained by various embodiments of a system or method according to the disclosure.

DETAILED DESCRIPTION

Figure 1:
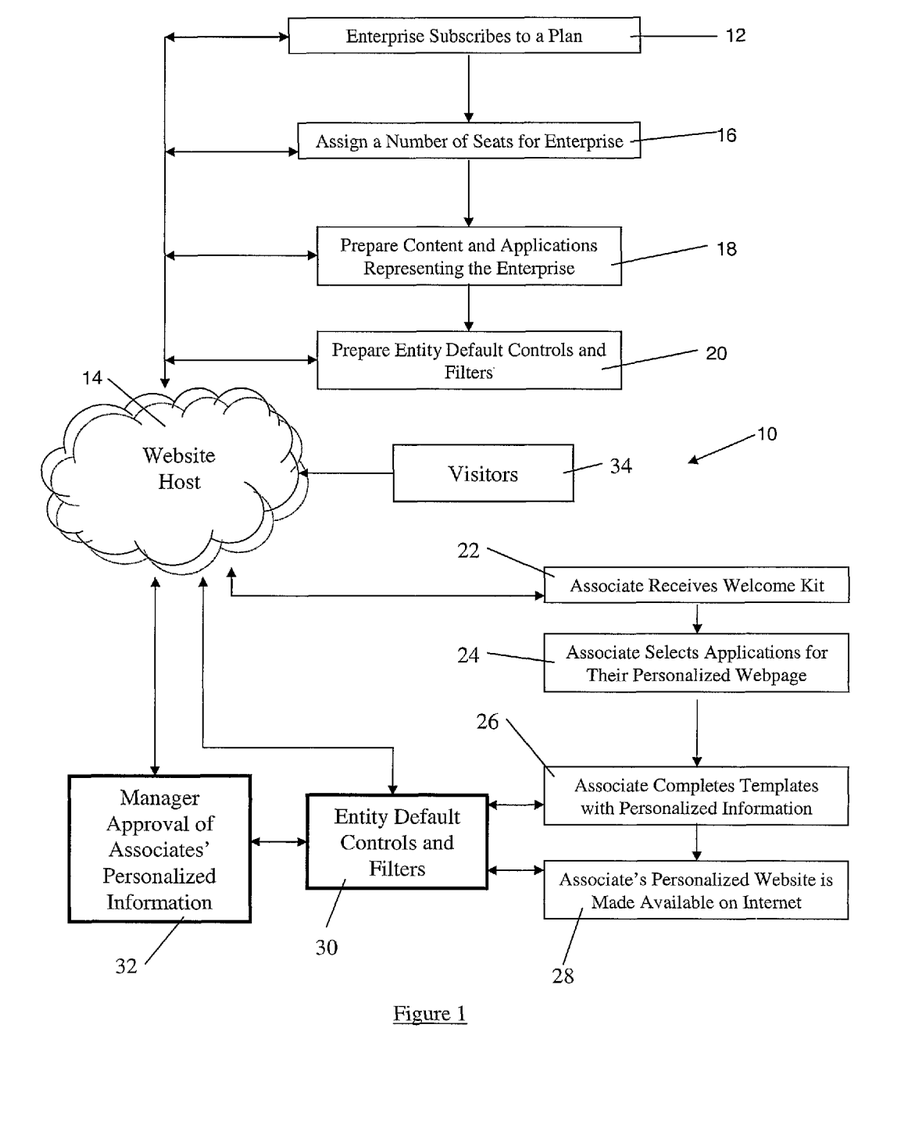
FIG. 1 is a flowchart illustrating a system and method of providing enterprise-managed websites for individual employees, associates, or members of the enterprise/organization.
Figure 2:
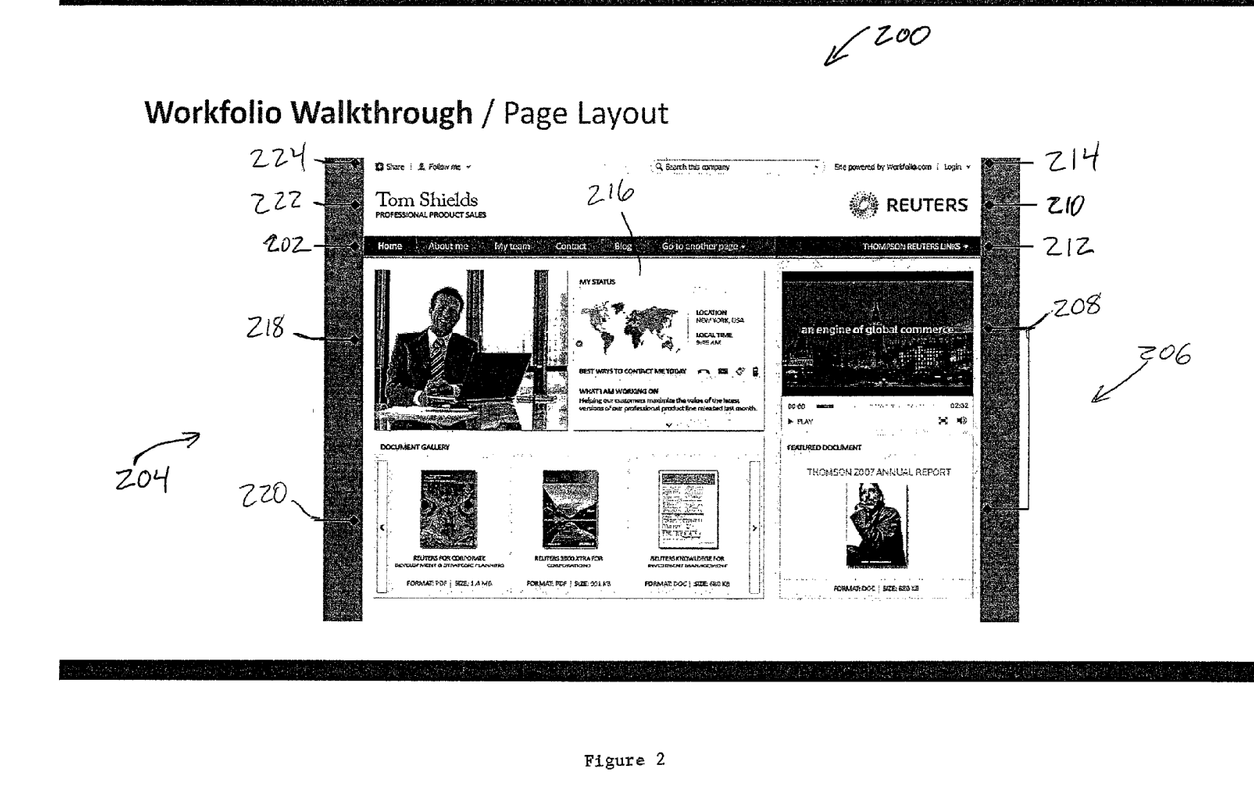
FIG. 2 is a representative user interface and web page layout for an enterprise-managed website system.

Referring to FIG. 1, an enterprise-managed website system is generally identified by reference numeral 10. System 10 will be described initially with reference to FIG. 1 that follows the steps that may be typically used to initiate the use of the system by one enterprise for one associate to prepare a representative web page as shown in FIG. 2. The functional elements of system 10 are described in greater detail below with reference to the diagram of FIG. 9.

Referring to FIG. 1, the enterprise initially subscribes to a managed website plan 12. As used herein, the term "enterprise" "company", "organization" and the like should be understood to include businesses, agencies, charities, schools, government agencies, or the like. When an enterprise subscribes to a plan at 12, the enterprise establishes an account. Various pages are available to the company administrator to configure the enterprise account and provide status information for the company 302 and the administrator 304, such as information relating to an overview of the account as shown by the "Overview" tab 310 selected within the user interface 300 depicted in FIG. 3.

Figure 3:
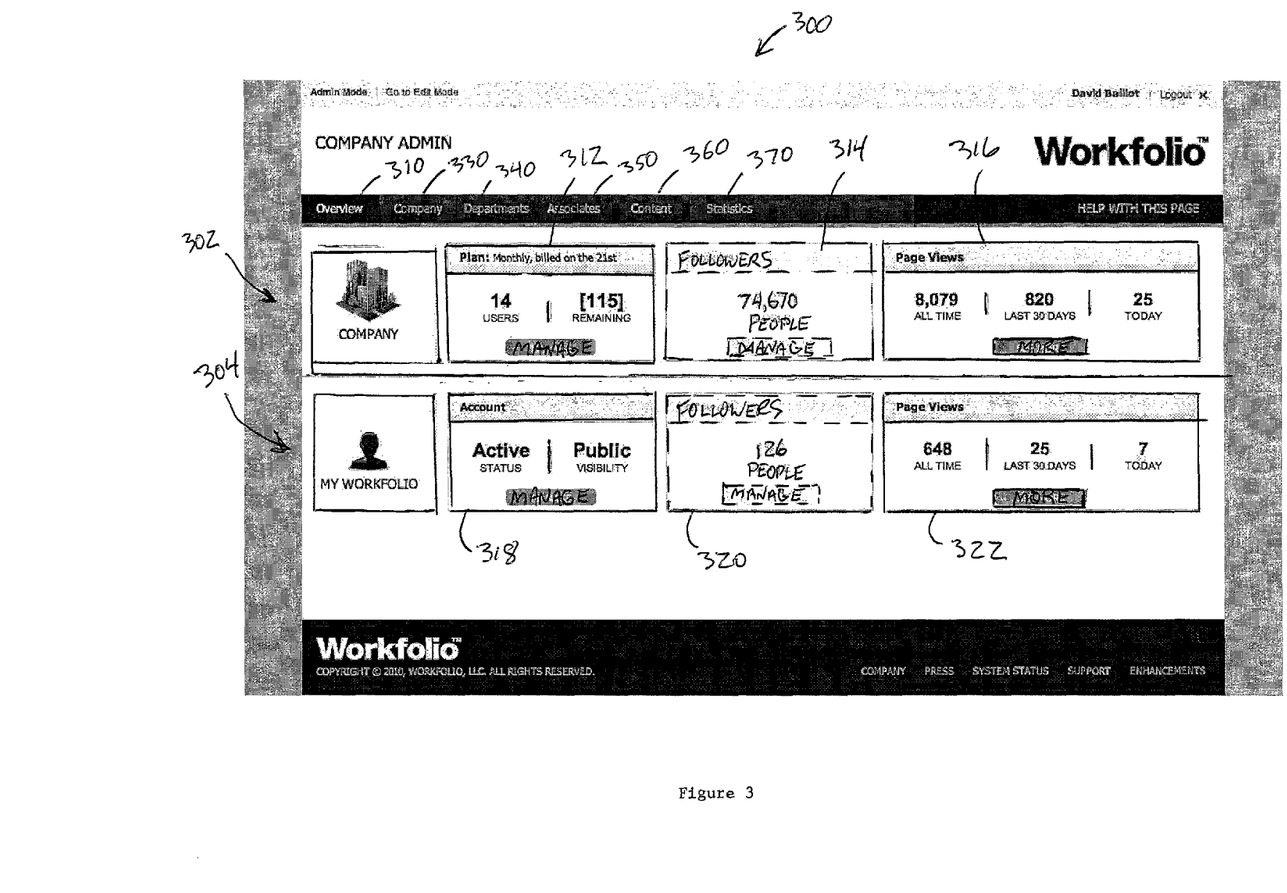
FIG. 3 is a representative user interface illustrating an administrator "overview" function or display and various other functions, utilities, or tools used to manage an enterprise-managed website system.

Various overview and/or status information for the account may be displayed as shown in FIG. 3. For example, the representative overview illustrated includes the plan details 312, such as the number of active users (14) currently authorized, the number of users available to be authorized (115) with the current plan, and the plan billing mode (monthly) and date (21$^{st}$). Plan information may be edited or managed by clicking on the associated "manage" button. The number of company "Followers" or subscribers (74,670), which may receive notifications when the company website is updated, for example, is displayed in a different color or grayed-out (as represented by dashed lines) at 314 and cannot currently be managed from the illustrated view. Company page views and related history is displayed at 316 with additional tracking statistics available by clicking the associated "More" button. Similar information is available for the user/administrator 304, such as account information 318 that may include the account status (Active) and current visibility setting (Public), which may be changed by selecting the corresponding "Manage" button. Associate follower information is displayed at 320 with associate web page view statistics and history displayed at 322. Other administrator functions may be accessed by selecting corresponding tabs or links. For example, the representative interface 300 includes tabs to access functions to configure/edit data associated with the Company 330, Departments 340, Associates 350, Content 360, and Statistics 370. Those of ordinary skill in the art will recognize that the administrator utilities, tools, or functions illustrated and described, as well as the particular user interface used to access the functions, may vary depending upon the particular application and implementation and is generally independent of the invention as claimed.

Figure 4:
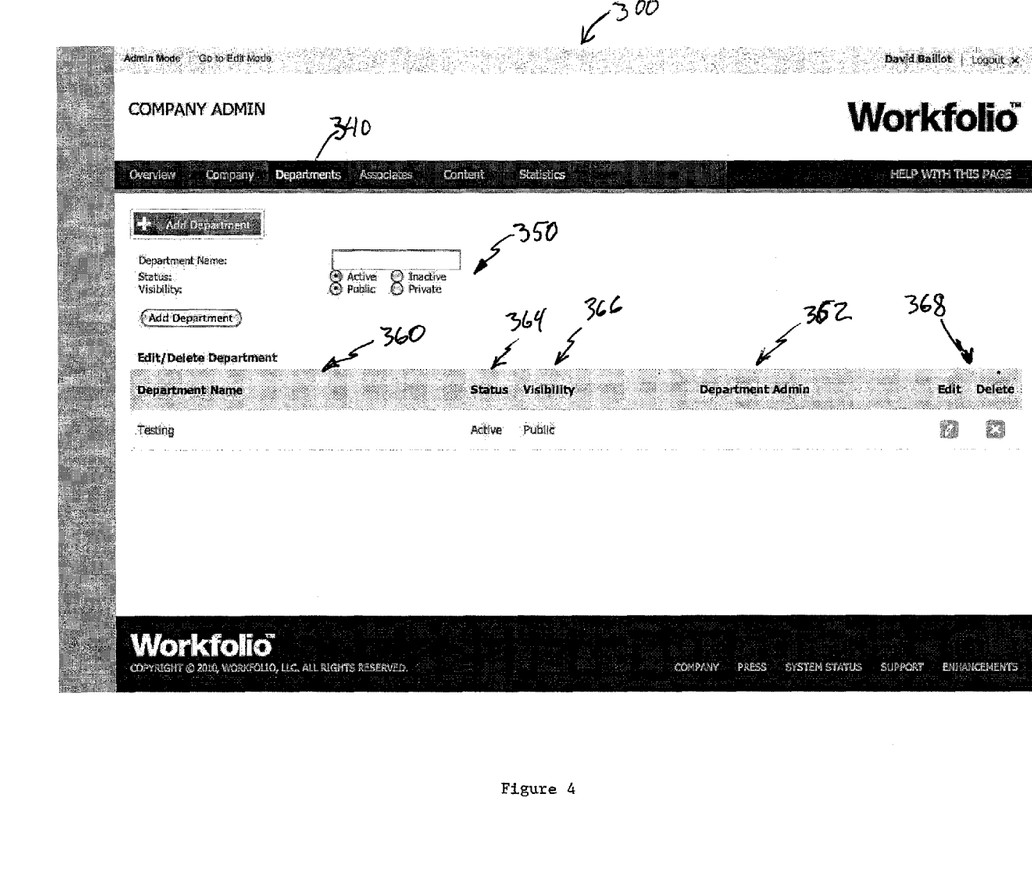
FIG. 4 illustrates various representative administrator functions or tools associated with the "Departments" tab of the user interface of FIG. 3.

The administrator may optionally assign one or more group/department administrators using interface 300 and selecting the "Departments" tab 340 such as shown in FIG. 4. The group administrator also provides company information or metadata to permit indexing the site established for the enterprise and provides the information to the website host server computer 14 for use by the website host search engine during knowledge mapping or other searching as described in greater detail herein. The group administrator may use a computer, such as a personal computer, to interact with the website host via an internal local area network (LAN) and/or an internal or external wide area network (WAN) such as the internet, for example. Those of ordinary skill in the art will recognize that the website host server computer(s) generally represented at 14 may be controlled by the organization, a third-party web hosting service, or a combination thereof without departing from the spirit or scope of the claims of this disclosure. In various embodiments, systems or methods of managed website development and deployment according to the present disclosure are implemented according to the SaaS (software as a service) model so that the website host 14, including related hardware and software are owned and licensed by a third-party provider relative to the enterprise or organization. However, the implementation may vary depending on the particular application.

The representative user interface for the "Departments" tab 340 includes various tools to add a department or group and specify its status and visibility as represented at 350. A listing of current departments 360 identifies a department administrator 362, status 364, visibility 366, and provides icons or buttons 368 to edit or delete a previously created department. As described in greater detail herein, a visibility level, generally indicated at 350 may be specified for designated content associate content corresponding to a department or group. The visibility level may include a number of settings depending on the particular implementation such as the private (internal to the enterprise) and public (available to internal and external users) settings shown in FIG. 4. Additional visibility levels may be provided to provide more granularity in controlling access to designated web pages. For example, in one embodiment, five (5) visibility levels are provided to limit or restrict access to particular associate content to authorized users: public (available to all internal and external users), internal (available to anyone within the enterprise), department/group (available to anyone associated with a specified group), password-protected (available to anyone with the proper password, and private (available only to the user/associate that created the content). Of course, the number of visibility levels and access definitions may vary by application.

Referring again to FIG. 1, a number of licensed seats associated with the subscription plan is assigned to the enterprise as represented by block 16. The number of seats may then be divided among members, associates, or users of the enterprise and may include one or more departments as determined by the group administrator during configuration as previously described. Depending upon the size and structure of an enterprise, one or more secondary group administrators or department administrators may be designated as being responsible for managing seats assigned to a corresponding functional group or department within the enterprise, i.e. payroll, accounting & finance, sales & marketing, engineering, etc. depending on the particular needs or desires of the enterprise.

Figure 5:
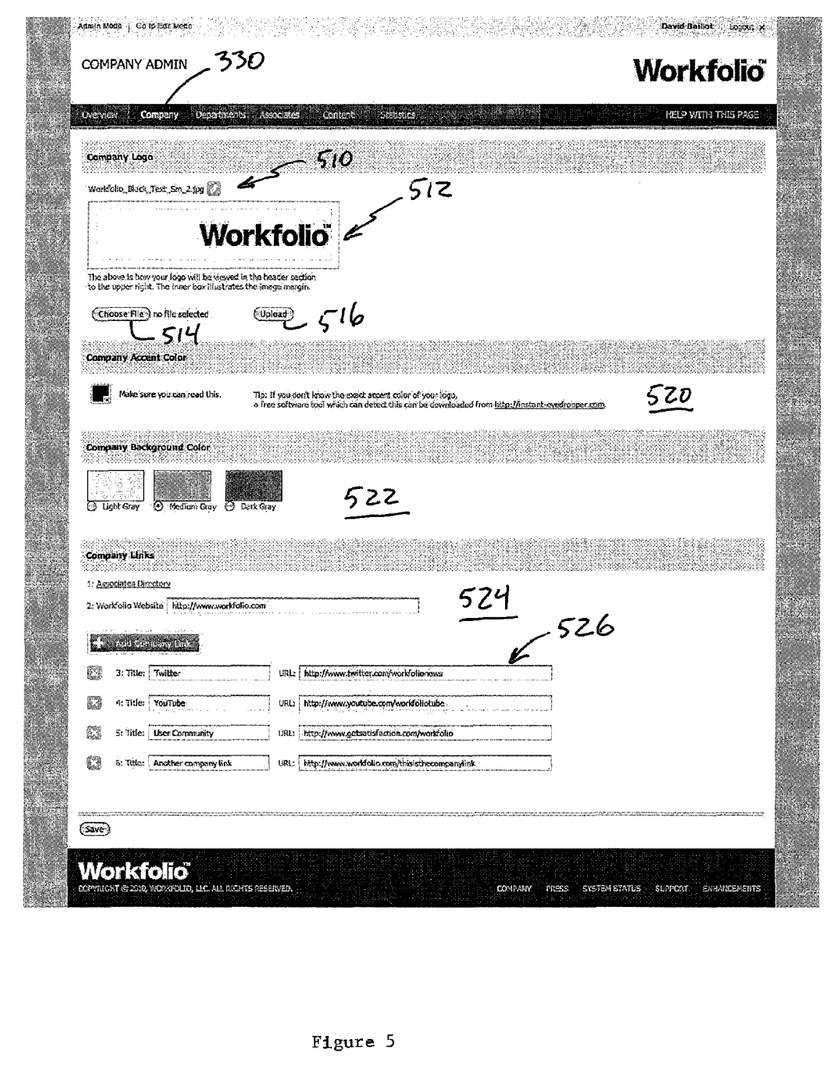
FIG. 5 illustrates a representative user interface for configuring and storing enterprise/organization content for display on each member/associate web page.

The group administrator (or another designated user or users) configures and stores the enterprise or company content associated with the enterprise as indicated at block 18 for subsequent display on associate web pages as described herein. The administrator may also select various enterprise applications or widgets to include in a widget library that may be used by organization associates (members or employees) to customize the enterprise and/or associate content that appears on an associate's website using a corresponding user interface such as the representative user interface illustrated in FIG. 5, for example. As previously described, company tab 330 may be used to access the user interface and associated tools to configure and store the company or enterprise content displayed on each associate's webpage. The user interface includes a display area 510 for identifying an image or graphic file which is uploaded and displayed in box 512. The image/graphic file may be used to display a company logo, slogan, tagline, etc. Tools or buttons for selecting the image or graphic file 514 and uploading the file 516 may also be provided. Company or enterprise content may also include a color scheme for consistent display or branding of the various borders, backgrounds, etc. In the representative embodiment illustrated in FIG. 5, the administrator may select a company accent color 520 and background color 522 for the company/enterprise content portion of the web page development system. In addition, company links may be associated with the content as represented generally at 524, which may include links to associate directories, the website host, and/or links to external third-party sites that may be accessed through the enterprise portion of the web page. The link title and corresponding URL may be specified as generally indicated at 526.

As also shown in FIG. 1, the administrator can specify a content policy that includes rules that may be automatically applied to screen content submitted by individual associates that prohibit or prevent display of specified information as generally represented by the default controls and filters at block 20. Default controls and filters may include setting up a language filter that will ensure that profanity or designated proprietary or confidential words, codenames, phrases, etc. are filtered out or removed from any content available on any web pages generated by associates of the company. Alternatively, or in combination, the screening process implemented by the policy may include a manual review and approval by an administrator or department manager. For example, content of an associate web page may be automatically screened for designated words or phrases, and if found, forwarded for review by an administrator. If the submitted content is not flagged by the policy, then the content may be published for display to authorized users based on an associated visibility level as previously described. The content policy implemented by the default controls may also designate which widgets may be used by all of the users of the managed website development and deployment system and which widgets may be used only by selected users based on a user ID and/or password, department/group affiliation, or other similar parameter. As used herein, the term "widgets" is understood to mean applications or pre-programmed templates or modules that include code, scripts, and/or software to provide a modular display area with any associated controls (such as buttons, media players, drop-down lists, input boxes, etc.) that may be selected and positioned on an associate's personal web pages. The widgets facilitate personal web page customization by the associates as a modular "drag and drop" component without requiring any knowledge of coding, programming, or scripting languages. Content may be added to a widget (such as a survey widget, for example) to further customize the web page depending on the particular implementation. Where content may be added, the enterprise policy should be applied to the widget content as well as surrounding content of an associate's web page.

Figure 6:
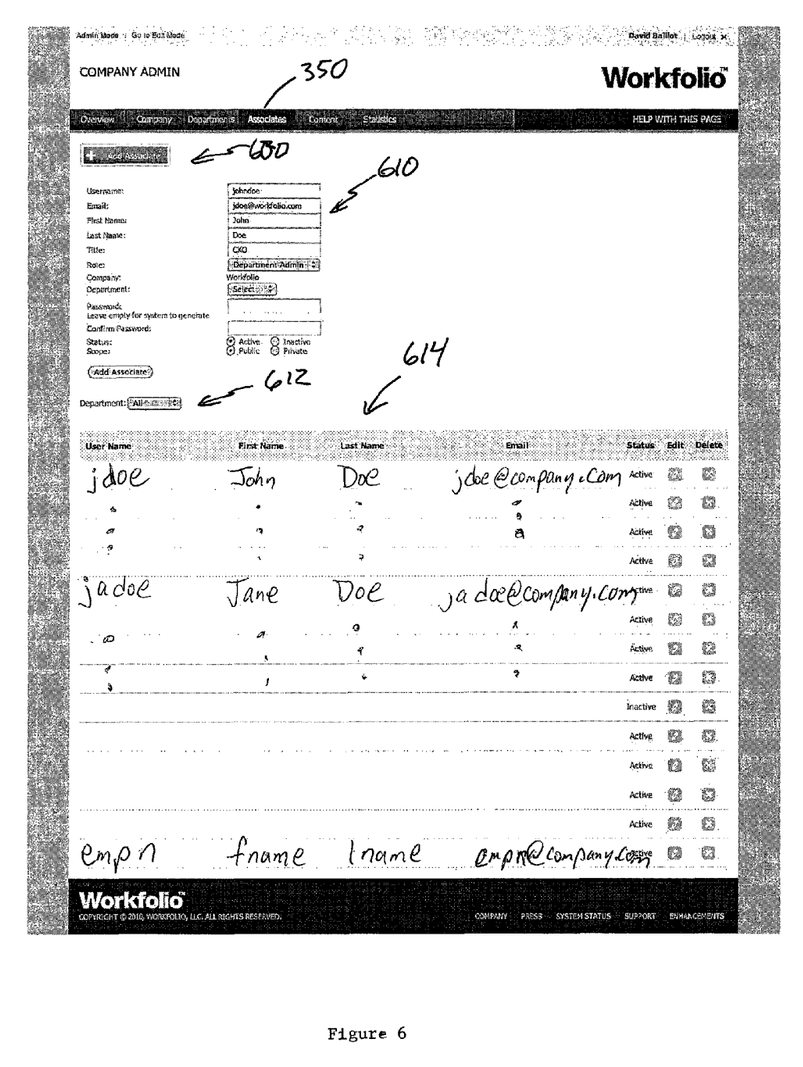
FIG. 6 illustrates a representative user interface for managing members or associates as indicated by the "Associates" tab of the user interface of FIG. 3.

The administrator may log into the system to manage the enterprise account and may create, delete or modify licensed seat assignments for corresponding associates using the representative user interface illustrated in FIG. 6. The associate functions may be accessed via "Associate" tab 350. The administrator may add an associate as represented at 600 and provide identifying information as generally indicated at 610. The information may include username or login, first/last name, title, role or job function, email address, status, group/department, and password, for example. A listing of currently assigned associates for a particular department or the entire organization is requested using a drop-down menu as indicated at 612 with corresponding designated data fields displayed as indicated at 614. The administrator may modify management rules applying to the system. The administrator may also designate statistics that may be monitored regarding web traffic generated by the enterprise through the system or by specific associates or departments.

As previously described, the group or enterprise administrator has access to various tools allowing management of the system configuration and enterprise content and enterprise policy. References to "tools" should be understood to refer to software or code that may be used to control certain aspects and features of the system. For example, a tool may simply comprise a control or switch that enables or disables a specific feature of function. The administrator may alter or block any content created on the system within the enterprise account. The administrator may edit, delete or add text, images or links that may be included as part of the content of the web pages developed and deployed or published using the system. For example, the administrator may block or permit links to any internal or external web-based utility.

Figure 7:
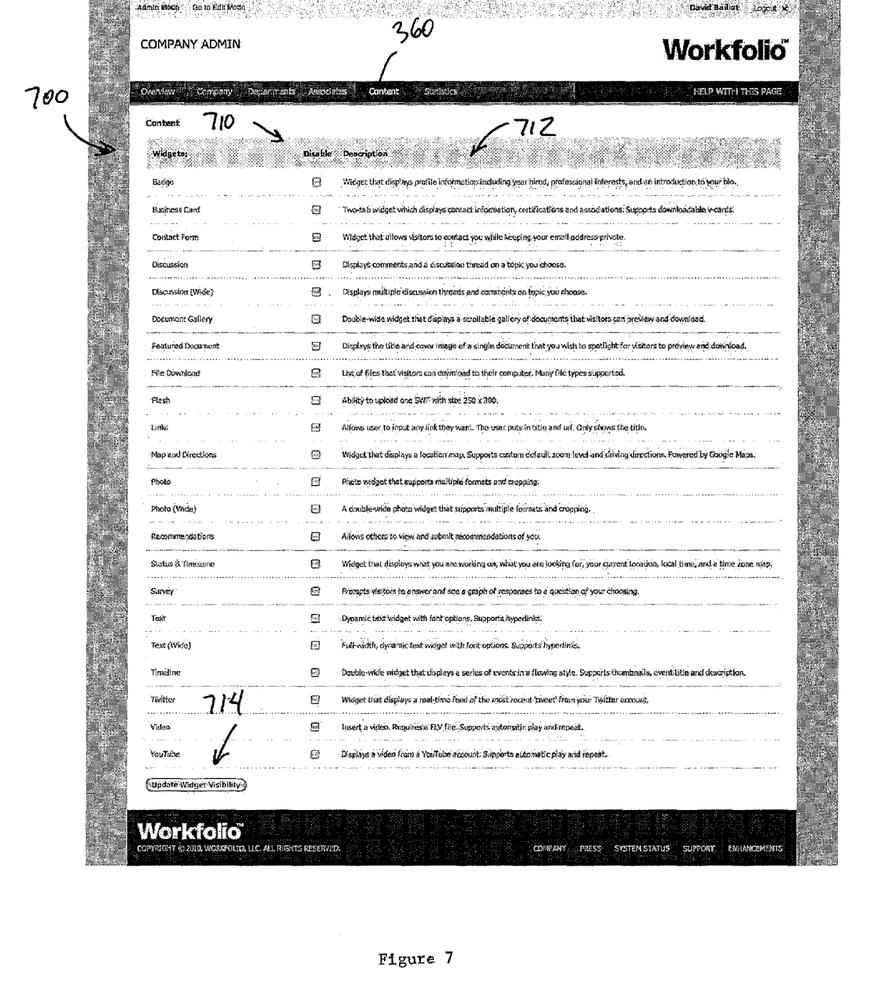
FIG. 7 illustrates a representative user interface or web page displaying widgets available for use by associates in preparing the associate content portion of the associate's web pages.

Referring to FIG. 7, an example of a company administration page is shown that lists the available widgets 700 and permits an administrator to enable or disable one or more widgets for an associate or group of associates as represented at 710. The group administrator may, in this way, specify which widgets may be used with the approval of the enterprise on the web pages developed by the associates and deployed by the system. As generally illustrated in FIG. 7, each widget 700 in the widget library may include a name, a brief description 712 and one or more visibility parameters 700 to enable or disable display of a particular widget for selection by an associate during development or modification of the associate's website. Various other tools (not specifically illustrated) may be used to manage widget availability, such as a drop-down menu or list of available departments, for example, depending on the particular application and implementation. The administrator may also be provided with tools that permit monitoring of associates' activities, such as log-in status and identification of all widgets displayed on an associate's web page, for example.

Figure 8:
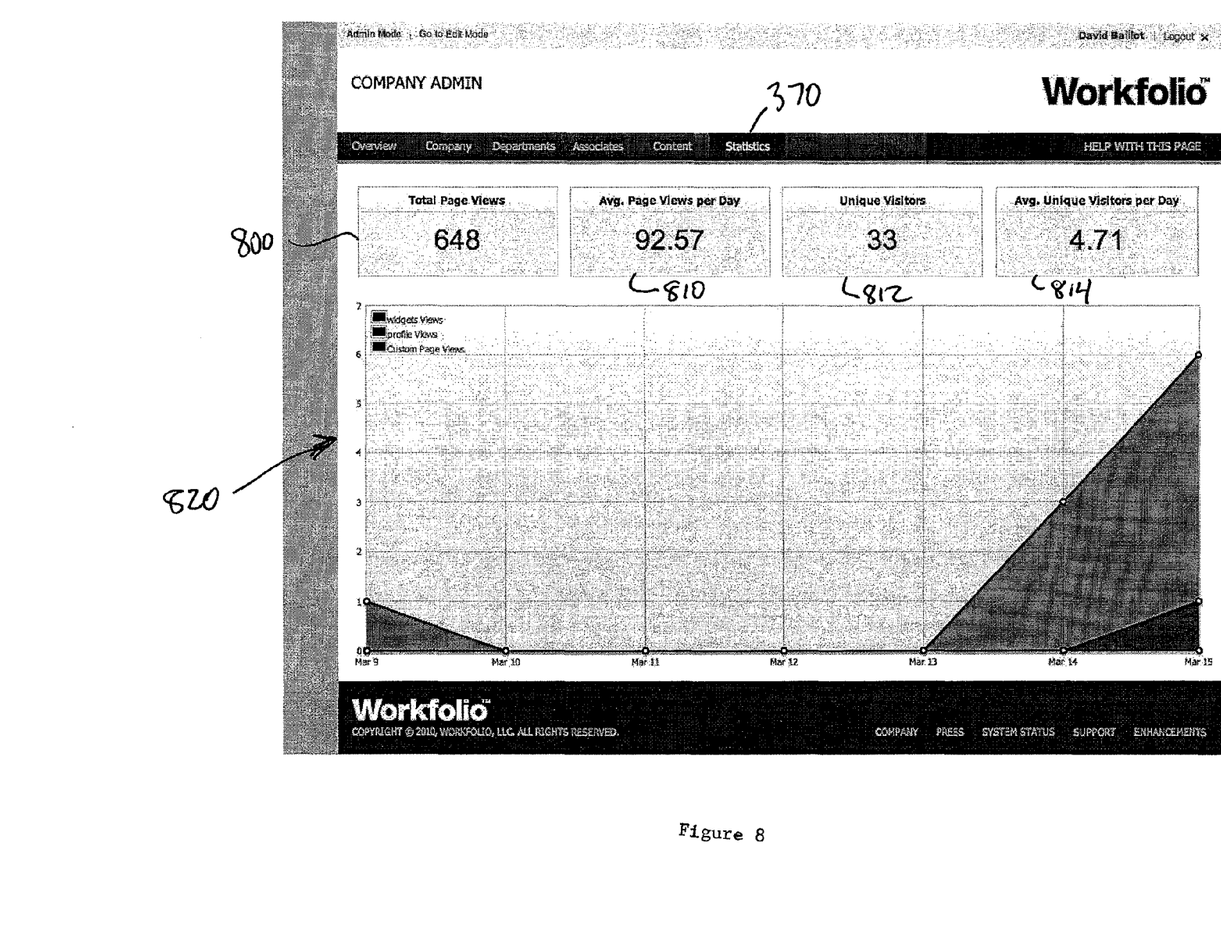
FIG. 8 is a representative user interface or web page providing statistics relating to page views and visitors.

The administrator may also determine what statistics should be collected or displayed relative to an associate's website using the representative user interface illustrated in FIG. 8. Such controls may also be modified to monitor web traffic through all or a designated group of the web pages developed by the associates of the enterprise. In the representative user interface of FIG. 8 accessed via the "Statistics" tab 370, statistics corresponding to total page views 800, average page views per day 810, unique visitors 812, and average unique visitors per day 814 are tracked and displayed. In addition, various statistics may be displayed in a graphical format as generally indicated at 820, such as widget views, profile views, and current page views over a specified period of time, such as six (6) days in the illustrated example. Of course, the statistics tracked and displayed as well as the type of graphical display may vary depending on the particular application and implementation.

Management responsibilities and tools available to the administrator may also be delegated to department administrators as previously described. Department administrators may be provided with authorizations and tools that are limited to the department to which they have been assigned by the enterprise administrator. When the department administrators are logged into the system, they may be enabled to designate or revoke department administrator designations or end user designations. Department administrators may also control widget usage permissions. For example, a department administrator may determine what widgets or applications may be used by associates within a given department. The department administrators also may edit the enterprise portion of the associate web pages that are visible on all of the web pages generated by associates within a particular department. The department administrator may also edit, delete or add any text, media or link to content that is external to the system. Statistics may be collected relating to web traffic for an entire department or for one or more associates. The department administrator may be also permitted to view usage of the system by each user within the department.

Referring again to FIG. 1, after configuring and storing various enterprise information, content, and settings on website host 14, a welcome kit may be provided or downloaded at 22 for each associate as authorized by the enterprise or department administrator. The associate may download the welcome kit by selecting a download option on the user computer's graphical user interface. As an example, the associate may select using graphical buttons, icons, menu commands, a voice command or a hyperlink. Upon receiving the welcome kit at 22 on the associate's personal computer, the associate may then begin to select application pages for the personalized web page at 24. Components or functional blocks of a representative associate or member web page delivered by website host computer(s) 14 to an authorized user based on one or more associated visibility levels is illustrated in FIG. 2.

As previously described, associates are provided with tools to facilitate development and customization of content for one or more personal web pages. The representative associate or personal web page 200 illustrated in FIG. 2 includes an associate menu bar 202 with various tabs that may be customized by the associate for easier navigation among multiple web pages that together form the associate's personal web site. Alternatively, or in combination, the associate menu bar may be specified by the enterprise to provide a consistent look and feel for all associate web sites and to encourage population of particular recommended content. For example, some menu tabs may be required with others optionally added by the associate depending on the particular implementation.

The associate may populate an associate content area or region of the web page as generally indicated at 204, with enterprise or company content 206 determined as previously described. Associates may not modify the company content 206, which may include company selected widgets 208, a company logo 210, and company links 212, for example, as well as the company color scheme as previously described. Website host 14 (FIG. 1) may also provide tools or navigational aids 214 for accessing the website development and management system from a "live" webpage.

Associate content may be provided via one or more widgets 218, 220 selected from a library of widgets available to a particular associate based on a corresponding visibility level as previously illustrated and described with reference to FIG. 7. The associate is permitted to select and position any widget that is not disabled by the enterprise or department administrator. The associate may add widgets from the widget tray or library to populate the associate's portion 204 of the page that is shown in conjunction with the company portion 206 of the page. An associate may also remove widgets 218, 220 if they no longer wish to use the widget. Widgets may also be edited by accessing the widgets within the associate's options menu. Widgets may be added to an associate's page by clicking on an "Add" button in the content browser. After a widget is added it may be moved by simply dragging and dropping the widget from the widget table or grid and moving it to the associate's portion 204 of the web page, which may be saved with all content and settings being saved to the web site host computer(s) 14. Widgets may be shared among associates with their added content and settings that will permit the widgets to be dynamically updated so that multiple members of a team may work with the widgets including content and settings as previously defined.

Referring again to FIG. 1, the associate may complete web page templates with personalized information as represented at 26. Some personal information may be automatically populated, such as the associate's name and position 222. Various associate links, tools, or navigational aids may also be provided, such as the "Share" and/or "Follow Me" buttons 224.

A number of widgets may be provided for use by associates. For example, the badge widget referred to in FIG. 7 may be used to display personal background information, including employee hiring date, professional interests and other biographical information. Other widgets, such as a status widget 216, photo widget 218, and document gallery widget 220 may also be added as will be described below. As previously described, various associate web pages or content areas may have an associate visibility level to limit access or display to only those authorized users as determined by the visibility level.

Each of the representative widgets identified in FIG. 7 are briefly described to provide an overview of the types of widgets that may be attached to an associate's web page. The list of widgets is not exhaustive and many other types of widgets or applications may also be provided to an associate if approved by the administrator. One widget that was previously identified is a badge widget that displays information regarding an employee or associate's information and may include the year that they were hired, their professional interests, and personal biographic information. Another, similar widget is a business card that displays an employee or associate's contact information, their certifications and associations. The business card application may also provide a downloadable v-card, for example.

Contact forms may be provided that allow visitors to contact the associate without knowledge of or disclosure of an associate's e-mail address or cell phone number, for example, which are kept private.

A discussion widget permits a selection of a topic by an associate and then allows comments to be displayed in the form of a discussion thread on the topic. Similarly, a discussion widget may be provided that permits the display of multiple discussions threads and comments on one or more topics selected by an associate or group of associates.

A document gallery widget may be used by an associate to display a scrollable gallery of documents that visitors can preview and download. In a similar manner, a featured document may be provided that displays the title and cover page of a single document that is highlighted to encourage visitors to preview and download the featured document.

A file download widget may be provided that includes a list of files that an associate has determined should be made available to visitors for download to their computer. In some embodiments, many file types may be supported for download including text files, video files, music files, scanned files, spreadsheets, and the like.

A flash widget may be provided that permits an associate to upload a small web format file (SWF) of a designated size.

A links widget may be provided that allows an associate to incorporate a link to a website. The links may be inserted by defining the title and URL of the link. Only the title would be available on the web page.

A map and directions widget may be provided that displays a location map. The map and direction widget may provide a map that is interactive in regard to zoom level and providing driving directions.

A photo widget may be provided to an associate that permits photos to be imported and also permits manipulation of the photographs in different formats and by cropping the photograph. Similarly, a photo (wide) widget may be provided that provides a larger portion of the screen for displaying certain photographs.

A recommendations widget may be used by an associate to permit others to view the web page of an associate and submit a recommendation of the associate.

A status and time zone widget may be used by an associate to display information relating to projects that the associate is working on. The status and time zone widget may also provide a way to post requests for information for a project. The status and time zone also provides the current location of an associate including the local time and a time zone map.

A survey widget may be used to prompt visitors to answer questions on a survey that may then be illustrated on a graph that reports responses in a graphical display.

A text widget may be provided to an associate that allows an associate to insert text on documents. The text function preferably affords an associate font options and other word processing functions. The text widget may also support hyper links that may be typed into a document as text that will allow reference to other websites. Similarly, a text wide widget may be provided that provides a larger portion of the space on the web page for the dynamic text widget function.

A time line widget may be provided to display a series of events on a time line. Thumbnails including event titles and description may be incorporated on the time line widget.

A Twitter® widget may be provided that permits an associate to display a real-time feed of recent tweets from or to an associate's twitter account. Widgets for other social networking sites or business networking sites may be incorporated that will function in a similar manner.

A video widget may be used that permits a video to be inserted on an associate's web page. A video widget requires a Flash® pFLV file and may be used to support automatic play and repeat functions of the video.

A YouTube® widget may also be provided that may be used to display a video from a YouTube® account. The YouTube® widget is also enabled to support automatic play and repeat.

While the above listing of widgets is fairly extensive, it should also be understood that many other widgets may be incorporated in the system as new technologies evolve.

Returning again to FIG. 1, upon completing configuration or editing of a personalized website, an associate may request that the website be made available or published on the internet (or internally depending on the designated visibility) at 28. Before the personalized website is made available, the enterprise policy is automatically applied, i.e. the website must pass through the entity default controls and filters at 30 that were previously set at 20. As previously described, the organization policy may flag particular content for subsequent approval by the associate's manager as represented at 32. The questionable content, pages, or website is held pending approval.

Website visitors may directly request a particular associate website or page using a corresponding address or URL at 34 in FIG. 1. Once approved for publishing, individual websites may be submitted to one or more search engines to assist visitors in locating a particular associate website or web page. The website host 14 may also have a search engine that is adapted to search all associate websites within an enterprise and/or across several enterprises to perform knowledge mapping of employee resources, skills, competencies, etc. Content available for searching may also be limited based on associated visibility levels and the credentials of the user requesting a search. The search engine may be designed to operate according to conventional methods that are known in the art. Visitors can directly access an associate's personalized website by following a direct link identified by the search engine or contained in an email, for example. If desired, visitors may be enabled to "follow" a particular associate or group of associates' websites by notifying the website to provide updates any time the associate or group of associates' websites have a change in content.

As previously described, visitors may also "share" a particular associate's web page by using an embedded tool as permitted by the website host. The tool may enable embedding of a direct link within a favorites list, email, etc. to facilitate sharing of the link with one or more other users. The tool may also automatically add a link to a current page in a conventional social networking site. The tool may also reference a particular page and identify it to a social networking site that has a book-marking feature, for example.

As previously described, website host 14 may provide the managed website development and deployment system or method according to the software as a service (SaaS) model or platform that allows multiple groups to create and organize web pages that are updated and administered by each of the enterprises. Each enterprise, by subscribing to the system, enables associates to create personalized web pages that facilitate communications over the internet. In addition, associates are permitted to share media and resources that are available from the website host as authorized by the group administrator. The enterprise can utilize the system to develop a knowledge map database. The knowledge map database can be published or maintained as a private resource that is accessible only to users within a particular organization, similar to intranet resources.

In one embodiment of a managed website system or method according to the present disclosure, associate content may be provided to more than one organization where multiple organizations are hosted by the same website host 14. Associates may authorize release of particular personal web pages or associate content from an entire associate website for compositing with organization information from a second organization. For example, an employee may authorize a second organization or enterprise, such as a professional society or trade group to access and incorporate the associate content developed for the first enterprise into personal web pages that combine the associate information with organization information from the second organization. As such, the managed website systems and methods according to the present disclosure provide the user with portable personal website content that can be easily incorporated into multiple organizations of which the associate is a member.

Figure 9:
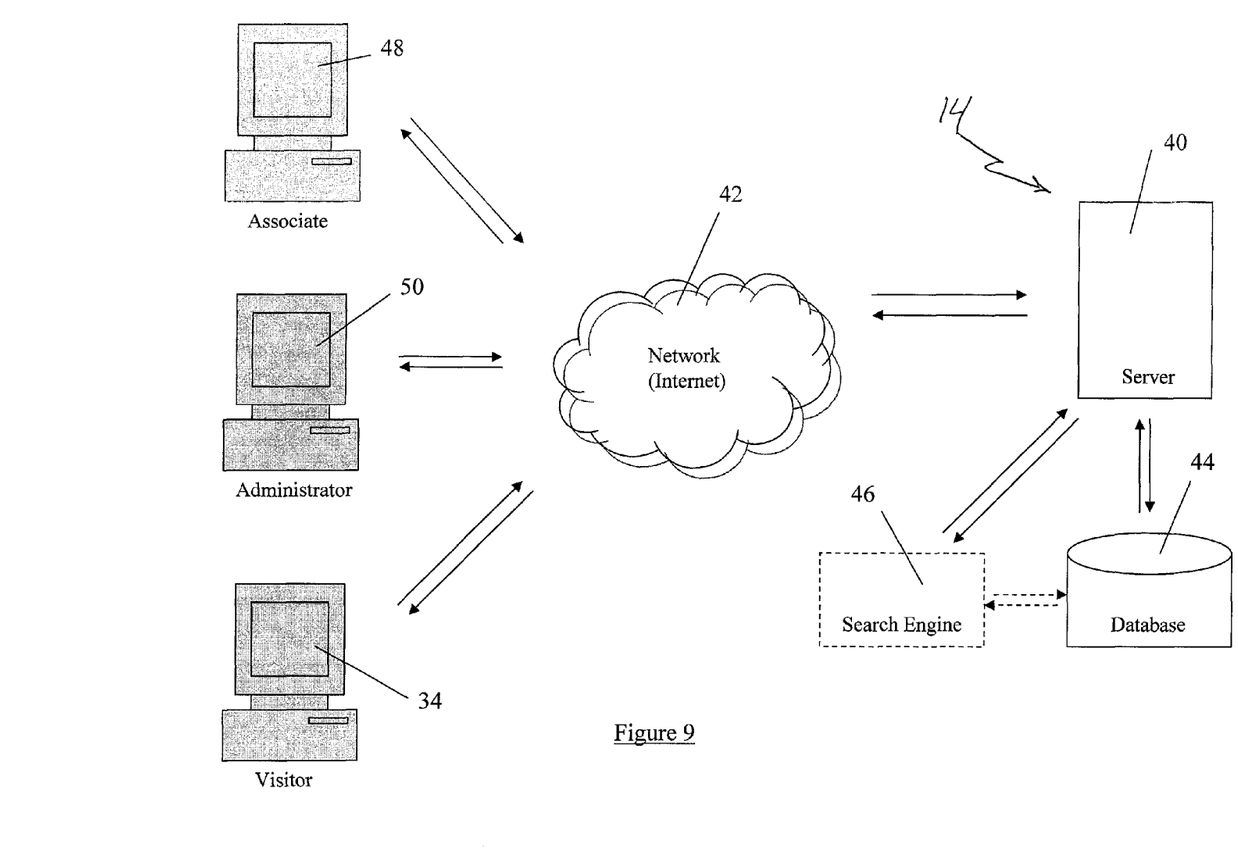
FIG. 9 is a diagram illustrating operation of a system or method for enterprise managed websites according to various embodiments of the present disclosure.

Referring to FIG. 9, a system diagram is provided that illustrates one approach to providing a system for implementing the process of FIG. 1. At the website host 14, a server 40 is connected to the internet, or network 42 as is well known. The server 40 stores information including data and instructions used to implement the organization policy, templates, widgets, user interfaces, organization content, associate content etc. in various files or structures, which may include a database 44. The server 40 and database 44 communicate with a search engine 46 which is shown in phantom lines to indicate that the search engine may be implemented by a software application that executes the search function. Associates 48 and administrators 50 of the enterprise interact over the network 42 with the server 40. Visitors 34 also interact with the server 40 over the network 42.

The database 44 stores each entity's information including the employee or associate web pages, administrator's instructions and control commands. The database also stores data relating to web site traffic and contacts. The number of contacts, extent of each contact and identity of the contacts (such as an IP address, for example) may also be stored in the database for retrieval by the administrator 50. The administrator can use the data to develop statistics that may allow the administrator to determine which employees are responsible for developing traffic and also provide information about the nature of the traffic generated, for example.

The search engine 46 is a software module that is accessible by the administrator and, if authorized, by some or all of the associates. The search engine 46 may be a separate module or may be part of a networking tool. The networking tool is a program that is installed on the web server 40. In one embodiment, associates 48 and administrators 50 have an application programming interface (API) that facilitates communication with the networking tool of the web server.

Figure 10:
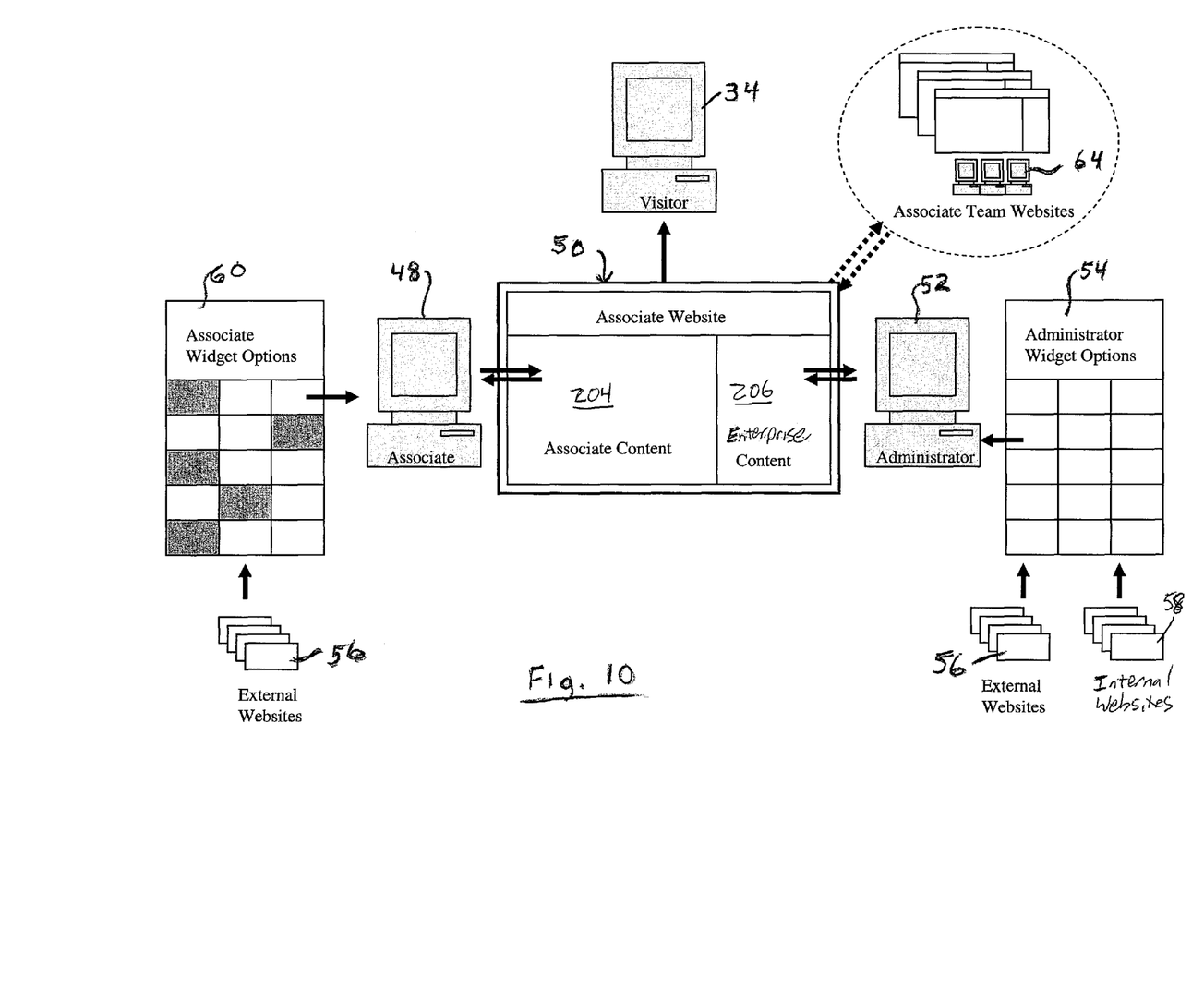
FIG. 10 is a diagram of the interfaces of the system with an associate, an administrator, and visitors with the associate's website.

Referring to FIG. 10, operation of the system will be described from the standpoint of interaction of different people or entities. An associate 48 using the system develops a web page or group of web pages (website) 50, using the system with control or over sight by a designated administrator 52. The administrator 52 uses a table, or list function, that is referred to as an "Administrator Widget Options" table 54 in FIG. 10. External websites 56 and internal websites 58 are reviewed by the administrator 52 who either authorizes or restricts the availability of particular sites to a particular associate 48. The administrator also provides enterprise content for most if not all of the web pages of an associate's 48 web site as previously described.

The associate 48 upon receiving a welcome kit at 22 in FIG. 1 may develop the content of their web site in a designated area referred to as the "Associate Content" portion of the web site. The associate selects widgets by dragging and dropping, or by another selection method, desired and authorized widgets from the table referred to as the "Associate Widget Options" table. In the table, some of the widgets are shaded boxes that indicate that the widget is unavailable to the associate as a result of restrictions imposed by the administrator 52. Alternatively, unavailable widgets may not be displayed at all. External websites 56 are screened and blocked using a corresponding policy at the Associate Widget Options table for use on the "Associate Website."

Associate team web sites 64 can be established by linking a plurality of associate websites together. Team websites may by established and monitored by the administrator 52 if it is determined that the enterprise requires control at this level. Alternatively, teams may be permitted generally and developed by associates on a dynamic and independent basis. For example, team members may offer invitations to other potential team members who may accept or decline membership. Team members may be added and deleted as desired. Shared widgets for a team may be limited to particular widgets that the team members are using for a project or for a continuing business function.

Visitors 34 may access the associate website 50 by means of a network such as the internet if the associate's web site is approved for such access by visitors 34. The visitor 34 may review the Associate Content at the same time the Enterprise Content is displayed on the Associate Website 50.

As illustrated and described with reference to FIGS. 1-10, a computer-implemented method for developing websites for members or associates 48 of an organization includes configuring and storing organization content 206 using a server computer 40 of a website host 14 associated with the organization. Server 40 may be physically located within and controlled by the organization, or may by implements by a SaaS model and be located in the cloud and controlled by a third-party. The method may also include configuring and storing member/associate content 204 associated with the members of the organization using the server computer 40. An organization policy 30 stored in database 44 and implemented by computer 40 may be used to screen member content 204 by applying corresponding filters or rules to prohibit specified information from being included in member content 204. The method may also include delivering a web page 50 having the enterprise content 206 arranged with member content 204 in response to a request by a user 34, 48 for viewing a webpage 50 having a URL corresponding to one of the members of the organization.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A computer-implemented method for developing websites with each website associated with an individual member of an enterprise, the method comprising:
    configuring and storing enterprise content on a server computer associated with the enterprise;
    configuring first associate content associated with a first individual member of the enterprise on the server computer;
    applying a stored policy configured by the enterprise to approve the first associate content before storing the first associate content, the stored policy including rules for comparing the first associate content to information prohibited by the enterprise
    selecting a visibility level associated with the first associate content to control subsequent display of the first associate content to authorized requesters;
    delivering a web page having the enterprise content and the first associate content in response to a request by an authorized requester for an associated URL received by the server computer, wherein new or updated first associate content is presented for review by an administrator designated by the enterprise for approval prior to delivering the web page.

2. The method of claim 1 wherein prohibited information is automatically removed from the first associate content before delivering the web page.

3. The method of claim 1 wherein configuring and storing first associate content comprises selecting from a plurality of modules approved by the enterprise and stored on the server.

4. The method of claim 3 wherein the plurality of modules includes a survey module for soliciting responses from visitors to the web page associated with the individual member of the enterprise.

5. The method of claim 1 wherein selecting a visibility level comprises selecting a visibility level for displaying the first associate content to at least one designated group within the enterprise.

6. The method of claim 1 wherein selecting a visibility level comprises selecting a visibility level for delivering the first associate content to requesters outside the enterprise.

7. The method of claim 1 further comprising:
    storing tracking results for each web page associated with each individual member of the enterprise and delivered by the computer server.

8. The method of claim 1 further comprising:
    knowledge mapping by searching associate content of all individual members of the enterprise; and
    presenting knowledge mapping results to authorized users based on a corresponding visibility level of the associate content.

9. The method of claim 1 wherein configuring first associate content comprises storing information reflecting work experience and competencies of a corresponding individual member of the enterprise on the computer server.

10. The method of claim 1 wherein the computer server is implemented by a web server hosted by a third-party relative to the enterprise.

11. A computer-implemented method for developing websites with each website associated with an individual member of an enterprise, the method comprising:
    configuring and storing enterprise content on a server computer associated with the enterprise;
    configuring and storing first associate content associated with a first individual member of the enterprise on the server computer;
    applying a stored policy configured by the enterprise to approve the first associate content before storing the first associate content, the stored policy including rules for comparing the first associate content to information prohibited by the enterprise
    selecting a visibility level associated with the first associate content to control subsequent display of the first associate content to authorized requesters; and
    delivering a web page having the enterprise content and the first associate content in response to a request by an authorized requester for an associated URL received by the server computer, wherein the first associate content is associated with more than one enterprise, the method further comprising delivering a web page having the first associate content and enterprise content associated with a second enterprise in response to a request by an authorized requester using a URL associated with the second enterprise and received by the server computer.

12. A computer-implemented method for developing websites for members of an organization, the method comprising:
    configuring and storing organization content using a server computer associated with the organization;
    configuring and storing member content associated with the members of the organization using the server computer;
    screening member content based by applying an organization policy stored on the server computer to prohibit specified information from being included in member content;
    delivering a web page having the enterprise content arranged with member content in response to a request by a user for viewing a webpage having a URL corresponding to one of the members of the organization; and
    storing a visibility level for specified member content that limits access to the specified member content only to authorized users, wherein the visibility level limits access to only the member of the organization that generated the member content and an organization administrator.

13. The method of claim 12 wherein each member of the organization configures and stores associated member content by selecting from a plurality of modules previously stored on the server computer and positioning at least one selected module on a web page for that member.

14. The method of claim 12 further comprising:
    tracking statistics associated with each web page delivered corresponding to each member of the organization.

15. The method of claim 12 further comprising:
    knowledge mapping of organization resources by searching across member content of web pages corresponding to each member of the organization.

16. The method of claim 12 wherein the organization content is automatically included on member web pages and cannot be modified by members of the organization other than a designated administrator.

17. The method of claim 12 further comprising:
    retrieving member content from a website external to the organization as specified by the member; and
    storing the retrieved member content on the server computer associated with the organization for subsequent display on the member web page.

18. A computer-implemented method for developing websites for members of an organization, the method comprising:
    configuring and storing organization content using a server computer associated with the organization;
    configuring and storing member content associated with the members of the organization using the server computer;
    screening member content based by applying an organization policy stored on the server computer to prohibit specified information from being included in member content;
    delivering a web page having the enterprise content arranged with member content in response to a request by a user for viewing a webpage having a URL corresponding to one of the members of the organization;
    storing a permission code associated with the member content that determines whether the member content may be used by a second organization; and
    delivering a second web page having the member content and second organization content associated with the second organization.

19. The method of claim 18 wherein the visibility level limits access to only those users within the organization.

20. The method of claim 19 wherein the visibility level limits access to a group of users within the organization based on permissions associated with a user network login.

21. The method of claim 18 further comprising:
    associating a password with a corresponding visibility level, wherein the visibility level limits access to only those users providing the password.

22. The method of claim 18 further comprising storing a visibility level for specified member content that prevents delivering at least the specified member content of the web page and the second web page to unauthorized users.

23. A computer-implemented method for developing websites for members of an organization, the method comprising:
    configuring and storing organization content using a server computer associated with the organization;
    configuring and storing member content associated with the members of the organization using the server computer;
    screening member content based by applying an organization policy stored on the server computer to prohibit specified information from being included in member content;
    delivering a web page having the enterprise content arranged with member content in response to a request by a user for viewing a webpage having a URL corresponding to one of the members of the organization;
    linking selected members of the organization together to form a group;
    storing a group visibility level associated with the group on the computer server associated with the organization;
    delivering the member content associated with the stored group visibility level together with the organization content only to members of the group; and delivering the organization content without the member content associated with the stored group visibility level to requesters that are not members of the group.

24. A system for managing websites each associated with a member of an organization, the system comprising:
- a server computer selectively accessible by an organization administrator, the server computer including stored organization content determined by the administrator for display on a portion of each member webpage;
- stored member content accessible by the server computer, the member content selected and configured by a member of the organization;
- a stored organization policy accessible by the server computer and having rules for screening member content to prevent specified information from being included in member content; and
- stored visibility level information accessible by the server computer corresponding to specified member content to limit access to the specified member content to only authorized users, wherein the server computer delivers web pages having the organization content arranged with member content in response to a request by a user for viewing a webpage having a URL corresponding to a specified one of the members of the organization.

25. The system of claim 24 further comprising a library of stored widgets accessible by the server computer and implemented by associated code, the widgets selectable by a member and positionable within a member portion of an associated member web page.

26. The system of claim 24 wherein the server computer tracks statistics associated with visits to each member webpage.

* * * * *